United States Patent
Zheng et al.

(10) Patent No.: US 10,039,167 B1
(45) Date of Patent: Jul. 31, 2018

(54) PHASE-CUT DIMMING CIRCUIT WITH WIDE INPUT VOLTAGE

(71) Applicant: Zhuhai Shengchang Electronics Co., Ltd., Zhuhai (CN)

(72) Inventors: Dehua Zheng, Zhuhai (CN); Xianyun Zhao, Zhuhai (CN)

(73) Assignee: Zhuhai Shengchang Electronics Co., Ltd., Zhuhai (CN)

( * ) Notice: Subject to any disclaimer, the term of this patent is extended or adjusted under 35 U.S.C. 154(b) by 0 days.

(21) Appl. No.: 15/642,353

(22) Filed: Jul. 6, 2017

(30) Foreign Application Priority Data

Mar. 29, 2017 (CN) .................... 2017 1 0195121
Mar. 29, 2017 (CN) .................... 2017 2 0314055 U

(51) Int. Cl.
  *H05B 33/08* (2006.01)
  *H05B 37/02* (2006.01)

(52) U.S. Cl.
  CPC ..... *H05B 33/0845* (2013.01); *H05B 33/0809* (2013.01); *H05B 33/0815* (2013.01); *H05B 33/0818* (2013.01); *H05B 33/0824* (2013.01); *H05B 33/0842* (2013.01); *H05B 33/0812* (2013.01); *H05B 37/02* (2013.01); *Y02B 20/346* (2013.01)

(58) Field of Classification Search
  CPC .......... H05B 33/0845; H05B 33/0815; H05B 33/0824; H05B 33/0818; H05B 33/0809; H05B 33/0812; H05B 33/0842; H05B 37/02; Y02B 20/346
  See application file for complete search history.

(56) References Cited

U.S. PATENT DOCUMENTS

| | | | | |
|---|---|---|---|---|
| 8,736,185 | B2* | 5/2014 | Chen | H05B 33/0845 315/200 R |
| 8,749,157 | B2* | 6/2014 | Ludorf | H05B 33/0854 315/224 |
| 9,113,521 | B2* | 8/2015 | Gredler | H05B 33/0815 |
| 9,131,581 | B1* | 9/2015 | Hsia | H05B 33/0815 |
| 9,609,713 | B1* | 3/2017 | Zheng | H05B 33/0812 |
| 9,660,535 | B2* | 5/2017 | Dearborn | H05B 33/0815 |
| 9,907,130 | B2* | 2/2018 | Chen | H05B 33/0815 |
| 2010/0123410 | A1* | 5/2010 | Tsai | H05B 33/0851 315/287 |

(Continued)

*Primary Examiner* — Tung X Le
*Assistant Examiner* — Borna Alaeddini
(74) *Attorney, Agent, or Firm* — Gokalp Bayramoglu

(57) ABSTRACT

The present invention discloses a wide input voltage phase-cut dimming circuit, which is connected and works in the overall dimming circuit. The overall dimming circuit includes a phase-cut dimmer, a dimming circuit, and an LED lamp. The dimming circuit includes a wide input voltage phase-cut dimming circuit, a switching power supply, a field effect transistor. The wide input voltage phase-cut dimming circuit includes a photoelectric coupler, and a PWM signal conversion circuit. The source and drain terminals of the field effect transistor are connected in series between the negative terminal of the output of the switching power supply and the negative terminal of the LED lamp. The output of the wide input voltage phase cut dimming circuit is connected to the gate of the field effect transistor. The output of the field effect transistor is controlled by the PWM signal conversion circuit.

6 Claims, 5 Drawing Sheets

(56) References Cited

U.S. PATENT DOCUMENTS

2013/0241433 A1\* 9/2013 Ge .................... H05B 33/0815
 315/224
2014/0265900 A1\* 9/2014 Sadwick ............ H05B 33/0803
 315/200 R \* cited by examiner

PHASE-CUT DIMMING CIRCUIT WITH WIDE INPUT VOLTAGE

CROSS REFERENCE TO RELATED APPLICATIONS

This application is based upon and claims priority to Chinese Patent Application No. 201710195121X (CN), filed on Mar. 29, 2017, and Chinese Patent Application No. 2017203140559 (CN), filed on Mar. 29, 2017, the entire contents of which are incorporated herein by reference.

TECHNICAL FIELD

The present invention relates to a phase-cut dimming circuit, particularly relating to a wide input voltage phase-cut dimming circuit.

BACKGROUND

The phase-cut dimming mode has some advantages. It is convenient for users to install and wire the circuit. Further, it is easy to convert the lighting circuit wiring in an old building into a lighting solution with a dimming function. Hence, the phase-cut dimming mode is more and more widely used. However, the input voltage range of the current phase-cut dimming power supply is narrow. For example, the input voltage range of the phase-cut dimming power supply which is suitable for the regions of China, Europe, Australia and etc. is within 170-265V, the input voltage range of the phase-cut dimming power supply which is suitable for the regions of North America, Japan and etc. is within 90-130V. Therefore, there is no phase-cut dimming power supply having an input range within 90-305V, which is suitable for most of electric networks in the whole world.

SUMMARY OF THE INVENTION

The problem which is intended to be solved by the present invention is to overcome the deficiencies of the prior art, and provide a phase-cut dimming power supply having an input range within 90-305V, which is suitable for most of electric networks in the whole world, and is suitable for both forward phase-cut and reverse phase-cut.

The technical solutions of the present invention are as below: A wide input voltage phase-cut dimming circuit, wherein the wide input voltage phase-cut dimming circuit is connected and works in an overall dimming circuit; the overall dimming circuit includes a phase-cut dimmer, a dimming circuit, and a LED lamp or a LED light, and the phase-cut dimmer, the dimming circuit, and the LED lamp or the LED light are sequentially connected; an input terminal of the phase-cut dimmer is connected to a phase line L of a power supply; wherein the dimming circuit includes a wide input voltage phase-cut dimming circuit, a switching power supply, a field effect transistor; an output terminal of the phase-cut dimmer is connected to one of two input terminals of the wide input voltage phase-cut dimming circuit, and one of two input terminals of the switching power supply; the other one of the two input terminals of the wide input voltage phase-cut dimming circuit and the other one of the two input terminals of the switching power supply are connected to a zero line N of the power supply; wherein a positive terminal of an output of the switching power supply is connected to a positive terminal of the LED lamp or the LED light; source and drain terminals of the field effect transistor are connected in series between a negative terminal of an output of the switching power supply and a negative terminal of the LED lamp or LED light; an output terminal of the phase cut dimming circuit is connected to a gate of the field effect transistor.

The wide input voltage phase-cut dimming circuit includes a first diode, a second diode, a first resistor, a second resistor, a third resistor, a fourth resistor, a transistor, a photoelectric coupler, a PWM signal conversion circuit; a positive terminal of the first diode, a positive terminal of the second diode are respectively connected to a phase line L and a zero line N of the power supply; a negative terminal of the first diode, and a negative terminal of the second diode are connected to one end of the first resistor; the other end of the first resistor is connected to one end of the second resistor, and a base of the transistor; wherein the other end of the second resistor is connected to an emitter of the transistor and shares a common ground with the wide input voltage phase-cut dimming circuit; a collector of the transistor is connected to one end of the third resistor, and a negative terminal of a light emitting tube of the photoelectric coupler; wherein the other end of the third resistor is connected to a positive terminal of the light emitting tube of the photoelectric coupler, and one end of the fourth resistor; the other end of the fourth resistor is connected to a power supply VCC; an output of the photoelectric coupler is connected to an input of the PWM signal conversion circuit; an output of the PWM signal conversion circuit is connected to a gate of the field effect transistor.

The PWM signal conversion circuit further includes a PWM signal to direct current signal circuit and a direct current signal to PWM signal circuit, or further includes a MCU signal conversion circuit.

The beneficial effects of the present invention are as below: the present invention includes the first diode, the second diode, the first resistor, the second resistor, the third resistor, the fourth resistor, the transistor, the photoelectric coupler, and the PWM signal conversion circuit. The positive terminals of the first diode and the second diode are respectively connected to a phase line L and a zero line N of the power supply. The negative terminals of the first diode and the second diode are connected to one end of the first resistor. The other end of the first resistor is connected to one end of the second resistor, and the base of the transistor. The other end of the second resistor is connected to the emitter of the transistor and shares a common ground with the circuit. The collector of the transistor is connected to one end of the third resistor, and the negative terminal of the light emitting tube of the photoelectric coupler. The other end of the third resistor is connected to the positive terminal of the light emitting tube of the photoelectric coupler and one end of the fourth resistor. The other end of the fourth resistor is connected to the power supply VCC. The controlling output terminal of the photoelectric coupler is connected to the input of the PWM signal conversion circuit. The output of PWM signal conversion circuit is connected to the gate terminal of the field effect transistor. After the input alternating current signal goes through the first diode, the second diode, the first resistor, the second resistor, the third resistor, the fourth resistor, the transistor, and the photoelectric coupler, a PWM signal having a frequency the same as the frequency of the rectified alternating current is generated from the transistor of the photoelectric coupler. The duty cycle of the PWM signal (i.e. the pulse width) is determined by the chopped alternating current, and the duty cycle of the PWM signal is irrelevant to the voltage magnitude of the alternating current. Since the frequency of the PWM signal is low, if it is directly used to control dimming, the naked eyes of human will feel obvious flickers, and a dimming range of 0-100% cannot be covered. Hence, the PWM signal is converted into a PWM signal having a frequency more than 200 Hz by the PWM signal conversion circuit and the dimming range of 0-100% is covered. Because the PWM signal is irrelevant to the voltage magnitude of the alternating current, the phase-cut dimming power supply having an input range within 90-305V is suitable for most of electric networks in the whole world and is suitable for both forward phase-cut and reverse phase-cut.

DETAILED DESCRIPTION OF THE INVENTION

Figure 1:
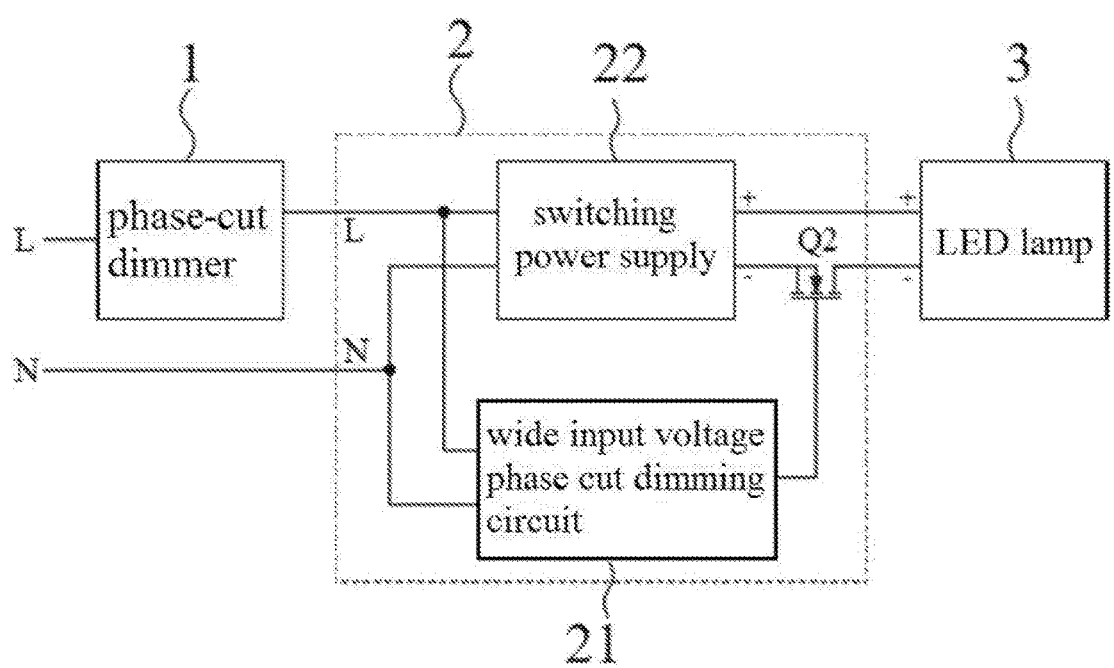
FIG. 1 is a block diagram of the system structure of the present invention.

As shown in FIG. 1 to FIG. 5, a wide input voltage phase-cut dimming circuit, which is connected and works in the overall dimming circuit. The overall dimming circuit includes phase-cut dimmer 1, dimming circuit 2, and LED lamp or LED light 3, which are sequentially connected. An input terminal of phase-cut dimmer 1 is connected to the phase line L of a power supply. Dimming circuit 2 includes wide input voltage phase-cut dimming circuit 21, switching power supply 22, and field effect transistor Q2. The output terminal of phase-cut dimmer 1 is connected to one of the input terminals of wide input voltage phase-cut dimming circuit 21, and one of the input terminals of switching power supply 22. The other one of the input terminals of wide input voltage phase-cut dimming circuit 21 and the other one of the input terminals of switching power supply 22 are connected to a zero line N of the power supply. A positive terminal of the output of switching power supply 22 is connected to a positive terminal of LED lamp or LED light 3. Source and drain terminals of field effect transistor Q2 are connected in series between a negative terminal of the output of switching power supply 22 and a negative terminal of LED lamp or LED light 3. The output terminal of wide input voltage phase cut dimming circuit 21 is connected to a gate terminal of field effect transistor Q2.

Wide input voltage phase-cut dimming circuit 21 includes first diode D1, second diode D2, first resistor R1, second resistor R2, third resistor R3, fourth resistor R4, transistor Q1, photoelectric coupler U1, PWM signal conversion circuit 201. The positive terminals of first diode D1 and second diode D2 are respectively connected to a phase line L and a zero line N of the power supply. The negative terminals of first diode D1 and second diode D2 are connected to one end of first resistor R1. The other end of first resistor R1 is connected to one end of second resistor R2, and a base of transistor Q1. The other end of second resistor R2 is connected to an emitter of transistor Q1 and shares a common ground with the circuit. A collector of transistor Q1 is connected to one end of third resistor R3, and a negative terminal of a light emitting tube of photoelectric coupler U1. The other end of third resistor R3 is connected to a positive terminal of the light emitting tube of photoelectric coupler U1 and one end of the fourth resistor R4. The other end of fourth resistor R4 is connected to a power supply VCC. An output of photoelectric coupler U1 is connected to an input of PWM signal conversion circuit 201. An output of PWM signal conversion circuit 201 is connected to a gate terminal of field effect transistor Q2.

PWM signal conversion circuit 201 further includes PWM signal to direct current signal circuit 211 and direct current signal to PWM signal circuit 212. Alternatively, PWM signal conversion circuit 201 can include MCU signal conversion circuit 213.

In the embodiment, the application environment of the present invention is shown in FIG. 1. The present invention is wide input voltage phase-cut dimming circuit 21 shown in FIG. 1. The electric supply is input into dimming circuit 2 after chopping by phase-cut dimmer 1, and then the chopped electric supply is input to switching power supply 22 and wide input voltage phase-cut dimming circuit 21 (i.e. the present invention) respectively. The alternating current is converted into a direct current with a constant voltage or a constant current by switching power supply 22, and is supplied to LED lamp 3 and wide input voltage phase-cut dimming circuit 21. After being chopped by phase-cut dimmer 1, the input alternating current is converted into a PWM signal by wide input voltage phase-cut dimming circuit 21. The frequency of the PWM signal is the same as that of the rectified alternating current. And then, the PWM signal is converted into a PWM signal having a frequency more than or equal to 200 Hz. Then, field effect transistor Q2 is controlled by this PWM signal, so that the output of phase-cut dimming circuit 2 is controlled to achieve the brightness control of LED lamp 3. Generally, the frequency of the PWM signal will be more than or equal to 200 Hz, because people will observe flickers when the period of the switching frequency is more than 5 ms.

It should be noted that dimming circuit 2 includes wide input voltage phase-cut dimming circuit 21 (i.e. the present invention), switching power supply 22, and some other auxiliary circuits. For better illustration of the principle of the present invention, only wide input voltage phase-cut dimming circuit 21, switching power supply 22, field effect transistor Q2 shown in FIG. 1, FIG. 3 and FIG. 4. The circuits which are little relevant to the present invention are not shown herein. Besides, switching power supply 22 can be a power supply with an active PFC correction, or can be power supply without a PFC correction. These are not essential for the present invention, so no detailed description is provided herein.

Figure 2:
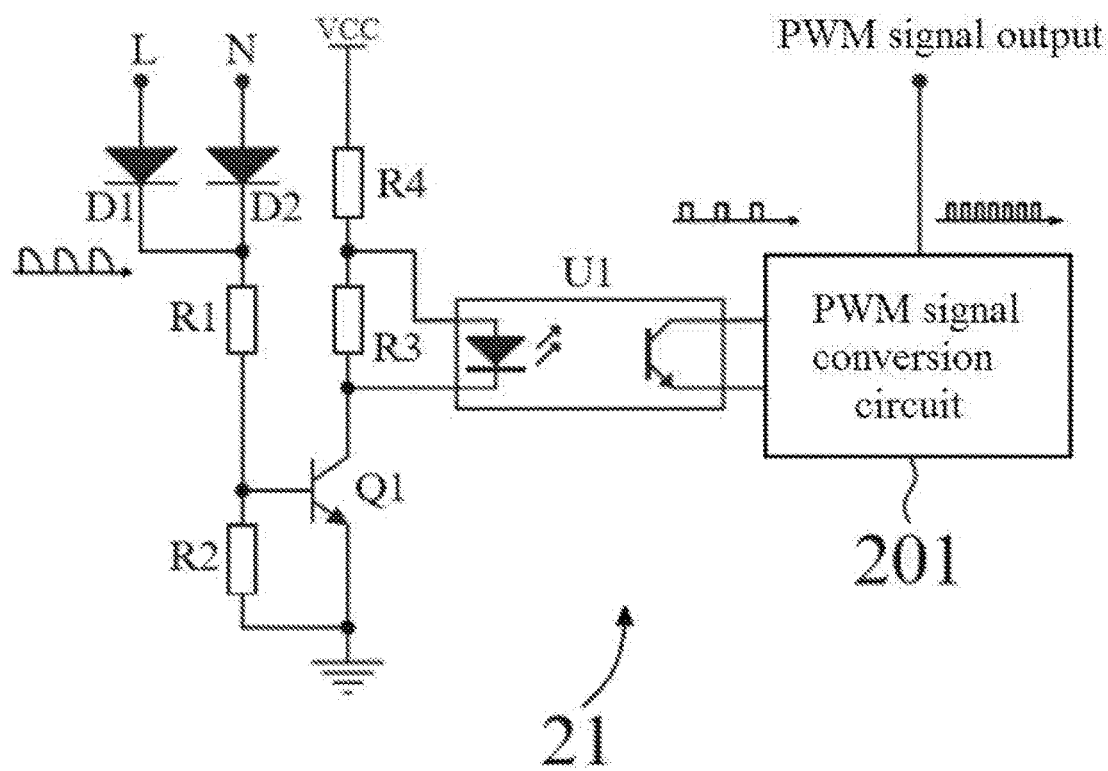
FIG. 2 is a circuit principle diagram of the present invention.

In the embodiment, as shown in FIG. 2, the anode terminals of first diode D1, second diode D2 are respectively connected to the input terminals L and N of the power supply of the overall phase-cut dimming circuit. The cathode terminals of first diode D1, second diode D2 are connected to one end of first resistor R1. The other end of first resistor R1 is connected to one end of second resistor R2 and a base (or gate) of transistor Q1. The other end of the second resistor R2 and an emitter (or source) of transistor Q1 are connected to the ground. The collector (or drain) of transistor Q1 is connected to one end of third resistor R3 and the cathode terminal of light-emitting diode of photoelectric coupler U1. The other end of third resistor R3 and the anode terminal of light-emitting diode of photoelectric coupler U1 are connected to one end of fourth resistor R4. The other end of fourth resistor R4 is connected to the power supply VCC. The transistor of photoelectric coupler U1 is connected to PWM signal conversion circuit 201. The PWM signal having a frequency more than or equal to 200 Hz is converted and output by PWM signal conversion circuit 201.

Figure 3:
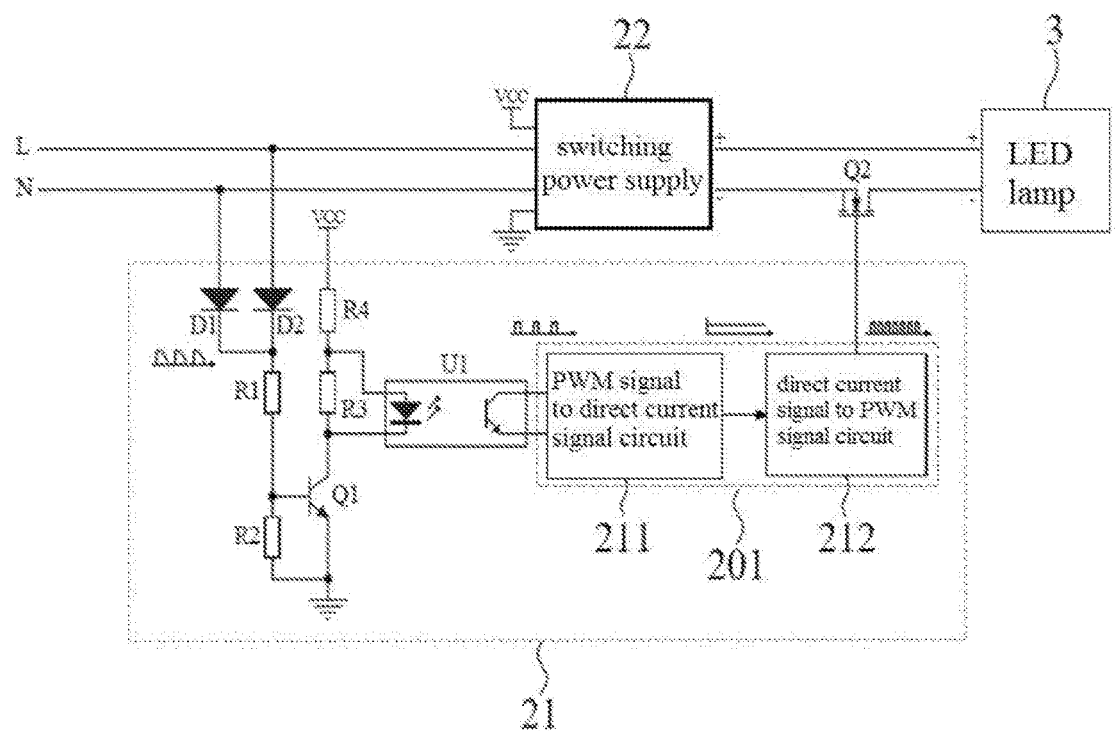
FIG. 3 is a circuit diagram of the embodiment 1 of the present invention.

The embodiment 1 of the present invention is as shown in FIG. 3. PWM signal conversion circuit 201 in the embodiment 1 is composed of PWM signal to direct current signal circuit 211 and direct current signal to PWM signal circuit 212. A part of the alternating current, after being chopped, is fed to switching power supply 22. The other part of the chopped alternating current is fed to wide input voltage phase-cut dimming circuit 21. Switching power supply 22 outputs a direct current with a constant voltage or a constant current through energy conversion to supply a working voltage for LED lamp 3 and wide input voltage phase-cut dimming circuit 21. The chopped alternating current is input into the cathode terminals of first diode D1, second diode D2 of wide input voltage phase-cut dimming circuit 21. The chopped alternating current is rectified by first diode D1, and second diode D2, and is voltage-divided through first resistor R1 and second resistor R2, and then input into the base (or gate) of transistor Q1. Once the voltage of the base (or gate) of transistor Q1 reaches the threshold voltage, transistor Q1 is switched on. The current of the power supply VCC goes through fourth resistor R4 and photoelectric coupler U1, and then through the collector (or drain) of the transistor to the emitter (or source), then to the ground, forming a current circuit. The light-emitting diode of photoelectric coupler U1 emits light and the transistor of photoelectric coupler U1 is switched on. A low electrical level is formed at the transistor of photoelectric coupler U1. When the voltage of the base (or gate) of transistor Q1 is lower than the threshold voltage, transistor Q1 is cut off. There is no current going through the light-emitting diode of photoelectric coupler U1, the transistor of photoelectric coupler U1 is cut off as well, and a high electrical level is formed at the transistor of photoelectric coupler U1. When the voltage of the base (or gate) of transistor Q1 reaches threshold voltage again, photoelectric coupler U1 is switched on again, the light-emitting diode of photoelectric coupler U1 emits light, and a low electrical level is formed at the transistor of photoelectric coupler U1. The above steps are repeated, and a PWM signal having a frequency same as the frequency of the rectified alternating current is generated at the transistor of photoelectric coupler U1. The width of the reversed phase pulse of the PWM signal is approximately equal to the width of the positive voltage waveform of the chopped alternating current, hence, it can be seen that the PWM signal is irrelevant to the voltage amplitude of the alternating current. Therefore, the present invention can be used in the phase-cut dimming power supply with a wide input voltage, which is suitable for the input voltage range within 90-305V. Third resistor R3 is connected in parallel to the light-emitting diode of photoelectric coupler U1 to have a shunt effect. The frequency of the generally used alternating current is within 47-63 Hz, which is low, so that the frequency of the PWM signal generated from the transistor of photoelectric coupler U1 is also low. If the PWM signal with the low frequency is directly used to control the light, the naked eyes of human will feel flickers easily, hence, the PWM signal needs to be converted into the PWM signal with a higher frequency. The PWM signal generated from the transistor of photoelectric coupler U1 is input into PWM signal to direct current signal circuit 211 of PWM signal conversion circuit 201. Generally, in the PWM signal to direct current signal circuit 211, the PWM signal will be firstly phase-reversed, then the PWM signal is converted into direct current signal by the integral circuit, and the voltage of the direct current signal is then regulated. A regulated direct current signal is output from PWM signal to direct current signal circuit 211 to direct current signal to PWM signal circuit 212. The direct current is converted into a PWM signal having a frequency more than or equal to 200 Hz by direct current signal to PWM signal circuit 212. The PWM signal is used to switch on and off field effect transistor Q2, so that the output of the phase-cut dimming power supply is controlled, and the brightness of LED lamp is thus controlled. Direct current signal to PWM signal circuit 212 can be composed of discrete components such as operational amplifier etc., or composed of a microcontroller and some peripheral components.

Figure 4:
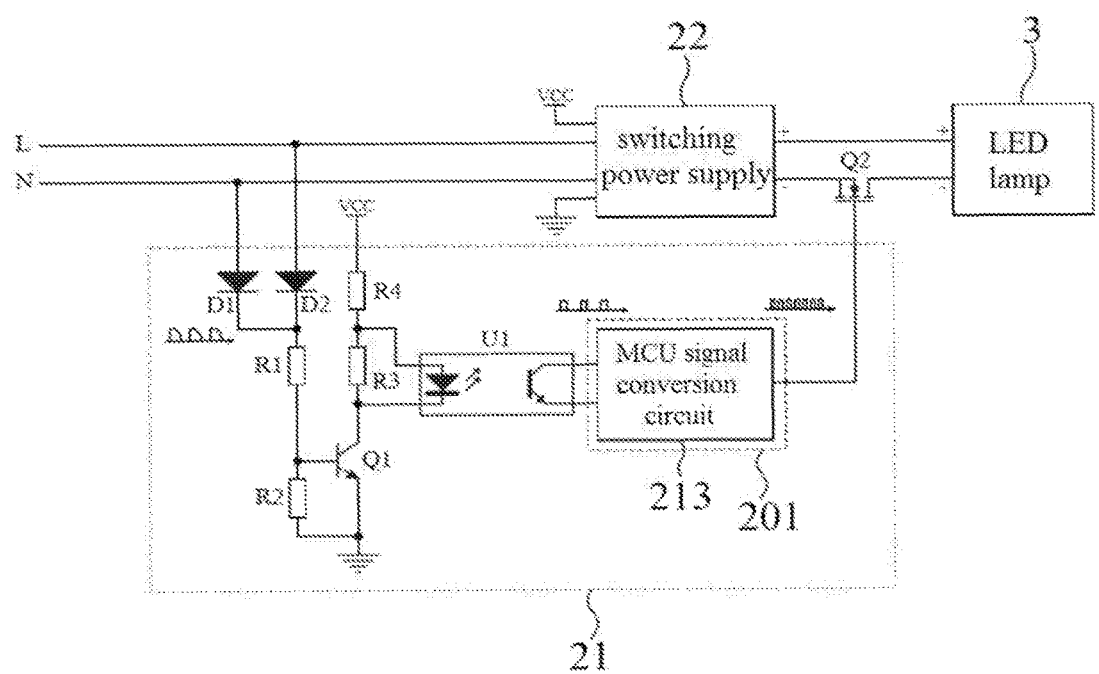
FIG. 4 is a circuit diagram of the embodiment 2 of the present invention.

The embodiment 2 of the present invention is as shown in FIG. 4. The difference between the embodiment 2 and the embodiment 1 is that PWM signal conversion circuit 201 includes MCU signal conversion circuit 213 instead. MCU signal conversion circuit 213 is composed of a microcontroller and some peripheral devices. The PWM signal generated from the transistor of photoelectric coupler U1 is input to the microcontroller of MCU signal conversion circuit 213. After being processed by the internal program of the microcontroller, the PWM signal with a certain duty cycle can be directly converted into another PWM signal with a corresponding duty cycle. The frequency of the converted PWM signal is generally more than or equal to 200 Hz, which is the same as the embodiment 1. In the embodiment 1, the PWM signal generated from the transistor of photoelectric coupler U1 needs to be firstly converted into direct current, and then the direct current is converted into PWM signal having a frequency more than or equal to 200 Hz. Unlike the embodiment 1, in the embodiment 2, the PWM signal having a frequency more than or equal to 200 Hz is directly formed after the PWM signal generated from the transistor of photoelectric coupler U1 is processed by the microcontroller of MCU signal conversion circuit 213.

Figure 5:
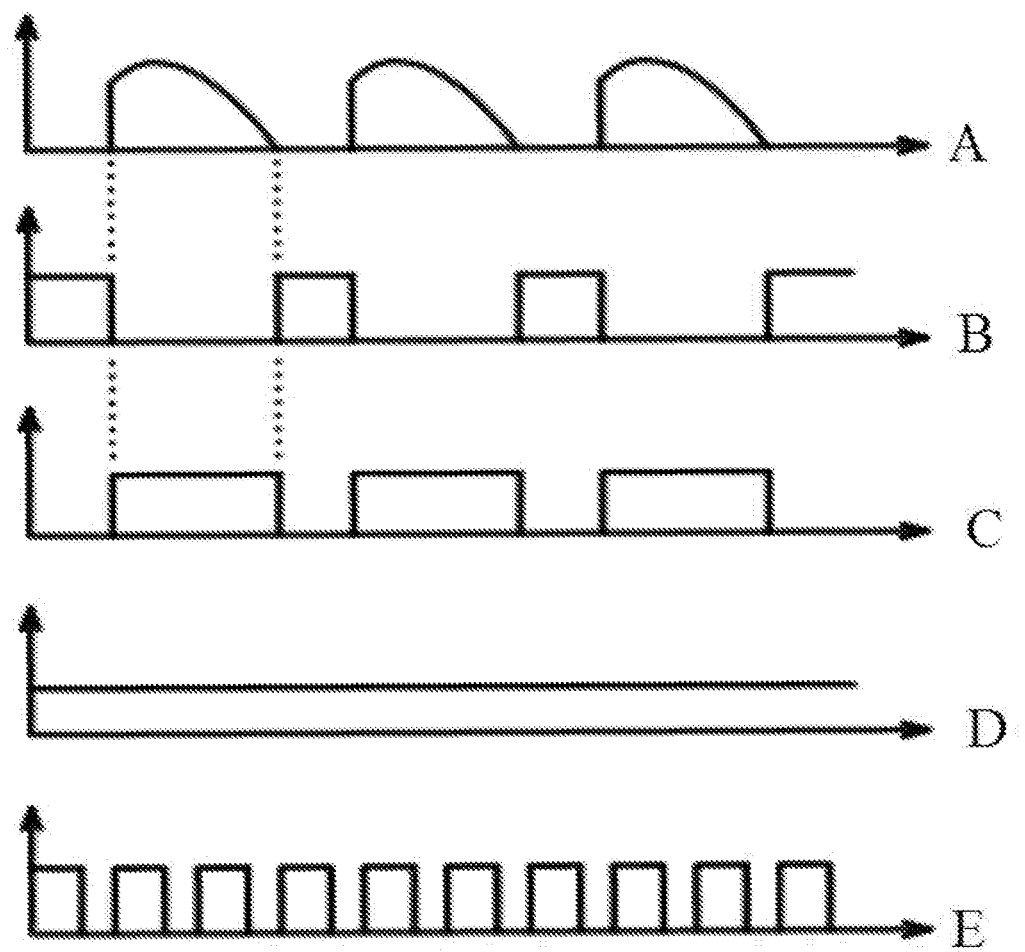
FIG. 5 is a waveform diagram of the present invention.

The principle of the present invention is further illustrated with the waveform diagram shown in FIG. 5. In FIG. 5, the waveform shown in FIG. 5 is a waveform of the alternating current chopped by a forward phase-cut dimmer and rectified by first diode D1, second diode D2. The waveform A is then voltage-divided by first resistor R1 and second resistor R2, and input to the base (or gate) of transistor Q1 to switch on and off transistor Q1. Generally, the threshold voltage of the base (or gate terminal) of transistor Q1 is a few tenths of volt or a few volts, so that the conduction time of transistor Q1 is almost equal to the width of the waveform A with a positive voltage.

When the positive voltage waveform of the waveform A is input into the base (or gate terminal) of transistor Q1 after voltage division, transistor Q1 is switched on, the light-emitting diode of photoelectric coupler U1 emits light, and the transistor of photoelectric coupler U1 is switched on. A low electrical level is generated at the transistor of photoelectric coupler U1. When the voltage of the waveform A is zero, the transistor is cut off, the light-emitting diode of photoelectric coupler U1 emits no light, and the transistor of photoelectric coupler U1 is cut off. A high electrical level is generated at the transistor of photoelectric coupler U1. When the next waveform with a positive voltage comes, the transistor Q1 is switched on again, the transistor of photoelectric coupler U1 is thus switched on as well, and a low electrical level is generated at the transistor of photoelectric coupler U1 again. The above steps are repeated. A PWM signal is generated at the transistor of photoelectric coupler U1, as shown in the waveform B of FIG. 5. The frequency of waveform B is the same as the frequency of waveform A. It can be seen from waveform A and waveform B in FIG. 5 that the PWM signal is irrelevant to the voltage amplitude of the alternating current, and thus an input voltage within a wide range of 90-305V can be realized. In the embodiment 1, the PWM signal of waveform B is phase-reversed by PWM signal to direct current signal circuit 211 of PWM signal conversion circuit 201 to obtain the PWM signal of waveform C as shown in FIG. 5. And then the PWM signal of waveform C is processed by integral circuit or other circuit to be converted into a direct current signal as shown in waveform D. The amplitude of a direct current signal is proportional to the duty cycle of the PWM signal. The voltage of the direct current signal is regulated by PWM signal to direct current signal circuit 211 and then the direct current signal is input to PWM signal circuit 212 of PWM signal conversion circuit 201. The direct current signal is converted into another PWM signal by direct current signal to PWM signal circuit 212. The frequency of the converted PWM signal is more than or equal to 200 Hz, as shown in waveform E of FIG. 5. The duty cycle of the PWM signal is proportional to the amplitude of a direct current signal. The PWM signal as shown in waveform E, generated by direct current signal to PWM signal circuit 212 is used to switch on and off the field effect transistor Q2, to control the output of phase-cut diming power supply and the brightness of LED lamp 3.

As to MCU signal conversion circuit 213 of PWM signal conversion circuit 201 in the embodiment 2, the PWM signal of waveform B does not need to be converted into direct current signal. The PWM signal of waveform B is directly converted into a PWM signal having a frequency more than or equal to 200 Hz by the internal program of the microcontroller, as shown in waveform E.

As discussed above, the present invention can be widely used in the phase-cut dimming power supply with a wide input voltage. Any modifications, improvements, or equivalent substitutions within the idea and content of the present invention fall into the claimed scope of the present invention.

What is claimed is:

1. An LED dimming system comprising:
   a phase-cut dimmer, a dimming circuit, and an LED light, wherein the phase-cut dimmer, the dimming circuit, and the LED light are sequentially connected;
   an input terminal of the phase-cut dimmer is connected to a phase line L of a power supply;
   wherein the dimming circuit includes a phase-cut dimming circuit, a switching power supply, and a field effect transistor;
   an output terminal of the phase-cut dimmer is connected to one of two input terminals of the phase-cut dimming circuit, and one of two input terminals of the switching power supply;
   the other one of the two input terminals of the phase-cut dimming circuit and the other one of the two input terminals of the switching power supply are connected to a zero line N of the power supply;
   wherein a positive terminal of an output of the switching power supply is connected to a positive terminal of the LED light;
   source and drain terminals of the field effect transistor are connected in series between a negative terminal of the output of the switching power supply and a negative terminal of the LED light; and
   an output terminal of the phase cut dimming circuit is connected to a gate of the field effect transistor;
   wherein the phase-cut dimming circuit comprises a first diode, a second diode, a first resistor, a second resistor, a third resistor, a fourth resistor, a transistor, a photoelectric coupler, a PWM signal conversion circuit;
   wherein a positive terminal of the first diode, and a positive terminal of the second diode are respectively connected to a phase line L and a zero line N of the power supply; a negative terminal of the first diode, and a negative terminal of the second diode are connected to one end of the first resistor; an other end of the first resistor is connected to one end of the second resistor, and a base of the transistor;
   wherein an other end of the second resistor is connected to an emitter of the transistor and shares a common ground with the phase-cut dimming circuit; a collector of the transistor is connected to one end of the third resistor, and a negative terminal of a light emitting tube of the photoelectric coupler;
   wherein an other end of the third resistor is connected to a positive terminal of the light emitting tube of the photoelectric coupler, and one end of the fourth resistor; an other end of the fourth resistor is connected to a power supply VCC; an output of the photoelectric coupler is connected to an input of the PWM signal conversion circuit; and an output of the PWM signal conversion circuit is connected to a gate of the field effect transistor.

2. The LED dimming system according to claim 1, wherein the PWM signal conversion circuit further comprises a PWM signal to direct current signal circuit and a direct current signal to PWM signal circuit.

3. The LED dimming system according to claim 1, wherein the PWM signal conversion circuit further comprises a MCU signal conversion circuit.

4. A phase-cut dimming circuit comprising:
   a first diode, a second diode, a first resistor, a second resistor, a third resistor, a fourth resistor, a transistor, a photoelectric coupler, and a PWM signal conversion circuit;
   wherein a positive terminal of the first diode, and a positive terminal of the second diode are respectively connected to a phase line L and a zero line N of a power supply; a negative terminal of the first diode, and a negative terminal of the second diode are connected to one end of the first resistor; an other end of the first resistor is connected to one end of the second resistor, and a base of the transistor;
   wherein an other end of the second resistor is connected to an emitter of the transistor and shares a common ground with the phase-cut dimming circuit; a collector of the transistor is connected to one end of the third resistor, and a negative terminal of a light emitting tube of the photoelectric coupler;
   wherein an other end of the third resistor is connected to a positive terminal of the light emitting tube of the photoelectric coupler, and one end of the fourth resistor; an other end of the fourth resistor is connected to a power supply VCC; an output of the photoelectric coupler is connected to an input of the PWM signal conversion circuit; and an output of the PWM signal conversion circuit is connected to a gate of the field effect transistor.

5. The phase-cut dimming circuit according to claim 4, wherein the PWM signal conversion circuit further comprises a PWM signal to direct current signal circuit and a direct current signal to PWM signal circuit.

6. The phase-cut dimming circuit according to claim 4, wherein the PWM signal conversion circuit further comprises a microcontroller unit MCU signal conversion circuit.

\* \* \* \* \*